United States Patent [19]

Sansone et al.

[11] Patent Number: 4,831,555

[45] Date of Patent: May 16, 1989

[54] UNSECURED POSTAGE APPLYING SYSTEM

[75] Inventors: Ronald P. Sansone, Weston; Michael P. Taylor, Norwalk, both of Conn.

[73] Assignee: Pitney Bowes Inc., Stamford, Conn.

[21] Appl. No.: 762,993

[22] Filed: Aug. 6, 1985

[51] Int. Cl.[4] .......... G06F 15/20

[52] U.S. Cl. .......... 364/519; 364/464.02; 380/51

[58] Field of Search .......... 364/464, 466, 519, 464.02; 380/51

[56] References Cited

U.S. PATENT DOCUMENTS

| | | | |
|---|---|---|---|
| 3,792,446 | 2/1974 | McFiggans et al. | 364/900 |
| 4,097,923 | 6/1978 | Eckert, Jr. et al. | 364/900 |
| 4,122,532 | 10/1978 | Dlugos et al. | 364/900 |
| 4,253,158 | 2/1981 | McFiggans | 364/900 |
| 4,302,821 | 11/1981 | Eckert et al. | 364/464 |
| 4,376,299 | 3/1983 | Rivest | 364/900 |
| 4,410,961 | 10/1983 | Dlugos et al. | 364/466 X |
| 4,423,486 | 12/1983 | Berner | 364/466 |
| 4,442,501 | 4/1984 | Eckert, Jr. et al. | 364/900 |
| 4,447,890 | 5/1984 | Duwel et al. | 364/900 |
| 4,471,441 | 9/1984 | Check, Jr. | 364/466 |
| 4,511,793 | 4/1985 | Racanelli | 364/466 X |
| 4,567,359 | 1/1986 | Lockwood | 235/381 |
| 4,584,648 | 4/1986 | Dlugos | 364/464 |
| 4,637,051 | 1/1987 | Clark | 380/23 X |
| 4,641,346 | 2/1987 | Clark et al. | 380/23 X |
| 4,641,347 | 2/1987 | Clark et al. | 380/23 X |
| 4,649,266 | 3/1987 | Eckert | 364/464 X |
| 4,660,221 | 4/1987 | Dlugos | 380/23 |
| 4,760,532 | 7/1988 | Sansone et al. | 364/466 X |
| 4,760,534 | 7/1988 | Fougere et al. | 364/466 |
| 4,775,246 | 10/1988 | Edelmann et al. | 380/23 |

*Primary Examiner*—Parshotam S. Lall
*Assistant Examiner*—Edward R. Cosimano
*Attorney, Agent, or Firm*—Peter Vrahotes; Melvin J. Scolnick; David F. Pitchenik

[57] ABSTRACT

An unsecured postage applying system wherein the printer and accounting unit are separated from one another by an unsecured link through use of encryption. The printer may be of any off the shelf type that is capable of printing alpha numerics or bar codes. More than one printer can be connected to a single accounting unit to provide a network of printers accommodated by the one accounting unit.

9 Claims, 2 Drawing Sheets

UNSECURED POSTAGE APPLYING SYSTEM

RELATED PATENT APPLICATIONS

Co-pending patent applications assigned to the assignee of the instant patent application and disclosing related subject matter include the following:

U.S. Pat. No. 4,641,347 entitled "System For Printing Encrypted Messages With A Character Generator And Bar Code Representation", filed July 18, 1983;

U.S. Pat. No. 4,637,051 entitled "System Having A Character Generator For Printing Encrypted Messages", filed July 18, 1983;

U.S. Pat. No. 4,660,221 entitled "System For Printing Encrypted Messages With Bar Code Representation", filed July 18, 1983;

U.S. Pat. No. 4,641,346 entitled "System For Printing And Reading Encrypted Messages", filed July 21, 1983;

U.S. Pat. No. 4,649,266 entitled "Method And Apparatus For Verifying Postage", filed Mar. 12, 1984; and U.S. Pat No. 4,757,537 entitled "System For Detecting Unaccounted For Printing In A Value Printing System", filed Apr. 17, 1985; and "Remote Postage Meter Inspection System" filed Aug. 6, 1985 and having Ser. No. 762,991.

BACKGROUND OF THE INVENTION

Since the issuance of U.S. Pat. No. 1,530,852 to Arthur H. Pitney, Mar. 24, 1925, the postage meter has had a steady evolution. Throughout the years, two general types of postage meters have been used: one that uses a rotary type printer, known as a rotary postage meter, and the other that uses a stationary print head and a reciprocating platen, known as a flat bed postage meter. Most recently, there has been a change from completely mechanical devices to meters that incorporate extensive use of electronic components. Although there have been a number of changes, there are certain elements that remain constant.

One of the constants has been that each meter had a printer included therein on a one-to-one basis, i.e. one metering device and one printing device incorporated into a unit. In postage meters, the need for security is absolute. Such security is applied in prior postage meters both to the printing portion of the meter and to the accounting portion. The reason for the need of absolute security is because a postage meter is printing value, and unless security measures are taken, one would be able to print unauthorized postage, i.e. postage for which no payment is made, thereby defrauding the U.S. Postal Service. Most security measures taken are of a physical nature, but recently there have been suggestions for the use of encryption to assure that a postage indicia is valid. Nevertheless, such encryption has merely supplemented the physical security systems that have been used and suggested by the prior art.

Although postage meters have performed satisfactorily in the past, and continue to perform satisfactorily, with the advancements in electronics and communications it is becoming apparent that ways of applying postage and accounting for the same can be achieved in systems that are less expensive to fabricate and more flexible in use while still providing the serviceability and security required.

SUMMARY OF THE INVENTION

An unsecured postage applying system has been devised wherein an off the shelf printer or a plurality of such printers may be used to print the required postage and may be controlled through an unsecured link. This printer would be connected to a computer or a combination of computer and printer, such as a work processor, may be used. The computer or word processor would be in communication with a secure metering unit that would include accounting and encryption modules. This secure metering unit, in turn, would be communicable with a control center, either directly or through a user computer, which would be capable of inputting postage to the metering unit. With such a device, a relatively inexpensive printer with great flexibility may be used. Encryption is utilized to prevent the printing of unauthorized postage. This combination of flexible printing and encryption would allow an inexpensive way of processing mail. A further advantage is that a plurality of printers can be connected to and served by a single metering unit in network fashion.

DETAILED DESCRIPTION OF THE PREFERRED EMBODIMENT

Figure 1:
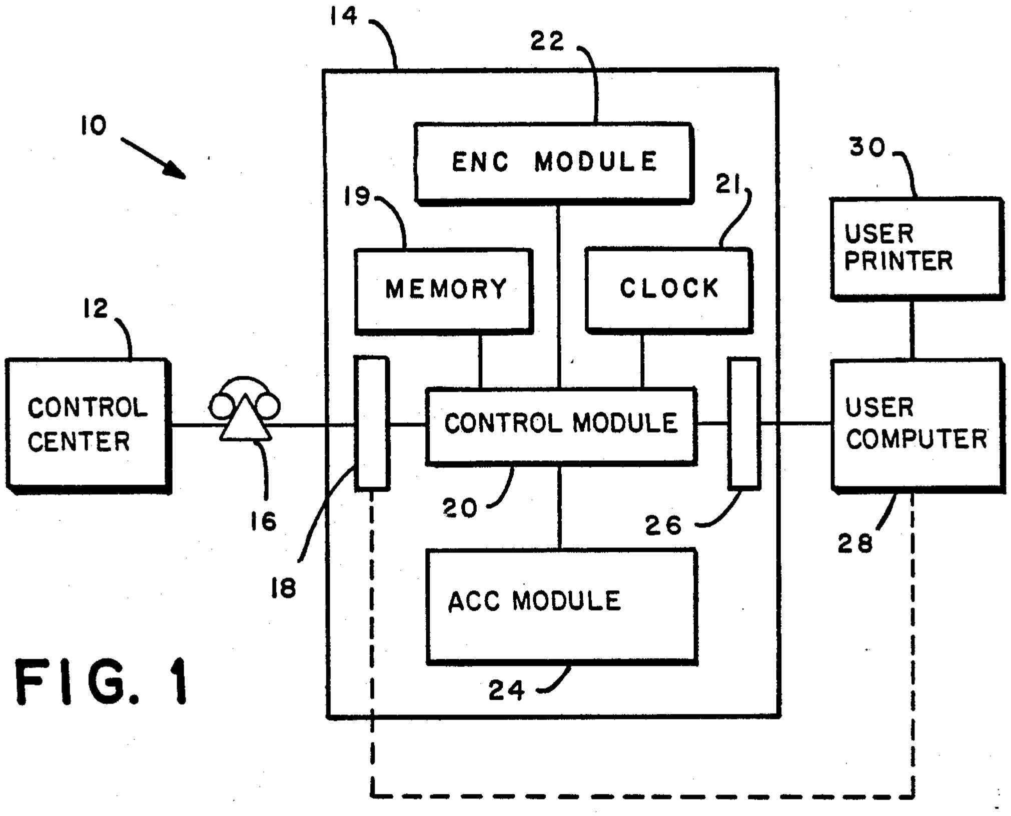
FIG. 1 shows a block diagram of a system that utilizes the instant invention.

Referring initially to FIG. 1, an unsecured postage applying system is shown generally at 10 and includes a control center 12 and a metering unit 14 that are in communication with one another through a communicating device such as a telephone 16, facsimile machine, telex machine, or the like.

Located within the metering unit 14 is a modem, port, or converter, 18 which interconnects the telephone 16 with a control module 20 of the metering unit 14, which control module 20 may be a CPU such as an Intel 8085 microprocessor. The control module 20 has a memory 19 and a clock 21 either integral or in connection therewith. The memory 19 would include ROM, RAM operation instructions as well as the meter or customer number and other useful information. In communication with the control module 20 is an encryption module 22 as well as an accounting module 24. The encryption module 22 may be encrypted in accordance with the NBS Data Encryption Standard (DES). A suitable device for such purpose is the Intel 8294 encryptor. The accounting module 24 may be a RAM that incorporates the ascending and descending registers as well as the transaction number. As is known, an ascending register is a register that records the amount of postage that has been dispensed, or printed, in all transactions and the descending register or register is that records the value, or amount of postage, remaining in the metering unit which value decreases as postage is applied. The transaction number is a unique number assigned by the control center 12 to the metering unit 14 at the time postage is charged or credited to the latter. Another modem 26 within the metering unit 14 interconnects the control module 20 with a user computer 28. It will be appreciated that the metering unit 14 may be at the same location as the user computer 28 or remote therefrom. The user computer 28 may be any type of computer that has input, memory, arithmetic, logic and output, for example, a personal computer such as the IBM personal computer AT. Connected to the user computer 28 is a user printer 30. Although the user printer 30 may be of any type that is capable of printing individual alpha numerics or bar code, a dot matrix printer is preferred. An example of a dot matrix printer would be a thermal printer or an ink jet printer. Although the combination of a user computer 28 and printer 30 is shown, it will be appreciated that a work processor may be used as outlined in place of the two.

In the block diagram shown in FIG. 1, the control center 12 is a source of postage value such as a Post Office. Systems are known whereby a postage meter may be charged remotely upon a customer number being provided to the Post Office. The Post Office, in turn, will provide postage value that is automatically inputted into the customer's postage meter, or in this case the accounting module 24 of the metering unit 14, and charged to the customer's account. An example of such a system is disclosed in U.S. Pat. No. 4,097,923. Although this preferred embodiment is described using remote resetting of the postage value, it will be appreciated that the metering unit 14 may be recharged by physically taking the same to a post office and paying for the amount of postage charged. In the system of FIG. 1, a secure postage meter is replaced by the metering unit 14 that is a secure unit such that tampering by physical, electronic or magnetic means is inhibited. Security features such as a shield, break away bolts and the like are well known and the means for physically securing the metering unit 14 will not be described. The metering unit 14 would have no display and would only be accessible by the user computer 28 upon a selected code being received by the control module 20 from the user computer 28. The user printer 30 is not a secure printer nor are the links between the user computer 28 and the metering unit 14 on th eone hand and the user computer 28 and the printer 30 on the other. The postage to be printed by the user printer 30 would include an encryption number that is generated by the encryption module 22. Such encryption may be based upon any recognized code such as DES, supra, or Rivest, Shamir and Adleman cipher (RSA). Upon the appropriate information being supplied to the metering unit 14 from the user computer 28, the encryption module 22 would generate an encryption number or encrypted message. This supplied information could include the customer number, the value of postage, address information and the like. The encrypted message is communicated to the user computer 28 for subsequent printing of the encrypted message.

In another preferred embodiment of the invention, the control center 12 communicates directly with the user computer 28 via the telephone 16. This communication link is shown by the dashed line in FIG. 1. There are two primary advantages to having direct contact between the control center 12 and the user computer 28. The first advantage is one of cost. Because communication between the control center 12 and the user computer 28 is on the basis of computer to computer, the modem 18 is not required. More specifically, only one modem 26 would be needed in the metering unit 14 and all components and costs associated with the modem 18 would be eliminated. The second advantage is that direct communication between the control center 12 and the user computer 28 allows participation on the part of the user in funds transfer since the transaction would be displayed as being transacted on the CRT of the user computer 28 and the user could observe and communicate any comments back to the control center 12.

Figure 2:
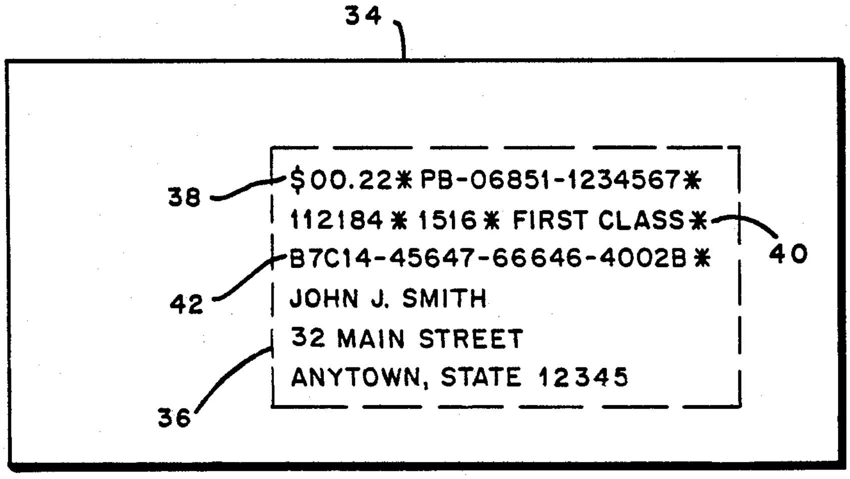
FIG. 2 is a plan view of a mail piece prepared in accordance with the instant invention.

Referring now to FIG. 2, a schme is shown whereby postage would be applied to a mail piece such as an envelope 34. In this particular configuration, an envelope 34 is shown with a label 36 attached to the block address portion of the envelope. It will be appreciated that the instant invention would include printing postage directly upon the mail piece or upon the block address portion of an insert that would be viewable through a window type envelope. The first line 38 of the label would have information relative to the amount of postage and the customer number. The second line 40 contains the date of the mailing, the time the postage is imprinted and the class of mail. The third line 42 contains an encrypted combination of numbers and letters that may be derived from the information on the first two lines as well as information from the address of the recipient of the mail that follows this third line and information contained in the metering unit 14. For example, the first encrypted message B7C14 could relate to the postage amount and date, the second group 45647 to zip code, the third group 66646 to the customer number and transaction number and the last group 40028 to the class of mail. Following these three lines 38, 40 and 42 are the name and address of the mail piece recipient which is printed by the printer 30.

The postage amount, customer number, and zip code are transmitted by the user computer 28 to the control module 20. The memory 19 provides the transaction number and the clock 21 provides the time. The encrypting module 22 then generates an encrypted message and sends it to the user computer 28 according to the system protocol. This encryption message line 42, is then printed by the user printer 30 on line 3 of the label 36 and the postage value is subtracted from the postage value stored in the accounting module 24. With this information, a Postal Service representative would be able to input the encrypted message into a suitable computer and decrypt in accordance with the selected cipher to determine whether the postage is genuine. More specifically, if one were to select characters at random for the third line 42 in order to send a mail piece through the mail without paying for the postage, it would be detected since the decrypted message could not be obtained from the information on the face of the labeel 36. Consequently, an unsecure printer 30 may be used because an unauthorized person would not be able to place an appropriate encrypted message 42 on the envelope 34.

Although the system has been shown using a plurality of lines, it will be appreciated that the encrypted information may be printed anywhere on the label 36 or envelope 34.

Figure 3:
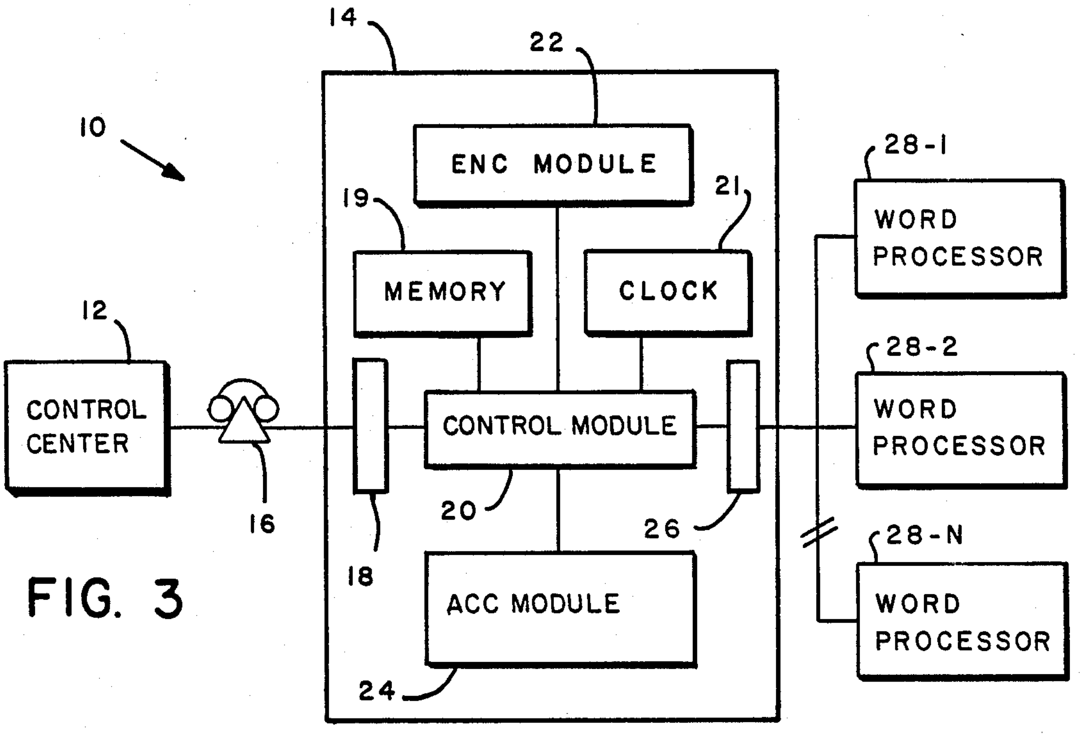
FIG. 3 is a block diagram similar to FIG. 1 but showing a system with a network of printers.

The advantage of the system shown and described in FIG. 3 is the use of a single metering unit 14 for a plurality of printing stations 28.1, 28.2 . . . 28.N. The metering unit 14 could belong to an individual who purchases postage from the Post Office and then supplies services to a number of other individuals through communication links. In FIG. 3 a network system is shown where like numbers are used to identify like parts as in FIG. 1. The modem 26 within the metering unit 14 acts as a gateway between the control module 20 and a plurality of user word processors 28-1, 28-2 . . . 28-n. The user word processor may be any type of word processor having computer capability such as a Dictaphone 6000 work processor. Although the word processors 28-1, 28,-2 . . . 28-n are shown as being connected in parallel, it will be appreciated that other types of connections may be used including serial, circular, star and the like.

What is claimed is:

1. A system for applying postage; said system comprises:

a secure metering unit, said metering unit including a control module, an encryption generating means, connected to said control module, and accounting means, also connected to said control module, for accounting for postage applied;

a computer, external of said metering unit;

means for providing unsecured communication between said control module and said computer, and an unsecured printer for printing postage, said unsecured printer communicating with said computer.

2. The system as claimed in claim 1 further comprises:

means for establishing unsecured communication between said control module and an external control center.

3. The system as claimed in claim 1 further comprises:

means, for establishing unsecured communication between said computer and an external control center.

4. The system as claimed in claim 1 further comprises:

at lease one word processor connected to said metering unit.

5. Asystem for applying postage; said system comprises:

a secure metering unit including a control module, an encryption generating means connected to said control module and accounting means connected to said control module;

a plurality of computers;

means for providing unsecured communication between said metering unit and each of said computers; and at least one unsecured printer connected to each of said computers.

6. The system as claimed in claim 5 further comprises:

means for providing unsecured communication between an external control center and said control module of said secure metering unit.

7. A method of applying postage to a mail piece; said method comprising the steps of:

storing postage value within a secure metering unit;

selecting an amount of postag to be printed;

communicating the amount of postage to said metering unit;

generating an encrypted message within said metering unit;

communicating said encrypted message and said amount of postage to an unsecured printer;

causing said unsecured printer to print said encrypted message and postage amount onto said mail piece; and subtracting the amount of postage applied from said postage value in said metering unit.

8. The method as claimed in claim 7 further including the step of:

including postage information in said generation of said encrypted message.

9. The method as claimed in claim 8 furthr including the step of:

communicating with a plurality of unsecured printers and selecting one of said printers to apply said encrypted message and postage onto said mail piece.

* * * * *